Dec. 14, 1965 R. J. MUELLER ETAL Re. 25,950

DISPENSING UNITS

Original Filed Feb. 17, 1960 4 Sheets-Sheet 1

INVENTORS:
RICHARD J. MUELLER
JAMES JOHNSON
BY Marzall, Johnston Cook & Root
ATT'YS Dec. 14, 1965 R. J. MUELLER ETAL Re. 25,950

DISPENSING UNITS

Original Filed Feb. 17, 1960 4 Sheets-Sheet 2

INVENTORS:
RICHARD J. MUELLER
JAMES JOHNSON
BY Marzall, Johnston, Cook & Root

DISPENSING UNITS

Original Filed Feb. 17, 1960 4 Sheets-Sheet 3

INVENTORS:
RICHARD J. MUELLER
JAMES JOHNSON
BY Marzall, Johnston, Cook & Root
ATT'YS

DISPENSING UNITS

Original Filed Feb. 17, 1960 4 Sheets-Sheet 4

*INVENTORS:*
RICHARD J. MUELLER
JAMES JOHNSON
BY Marzall, Johnston Cook & Root
ATT'YS United States Patent Office Re. 25,950
Reissued Dec. 14, 1965

25,950
DISPENSING UNITS

Richard J. Mueller, Franklin Park, and James Johnson, La Grange, Ill., assignors to Automatic Canteen Company of America, Chicago, Ill., a corporation of Delaware Original No. 3,059,450, dated Oct. 23, 1962, Ser. No. 13,659, Feb. 17, 1960. Application for reissue Aug. 18, 1964, Ser. No. 402,676
14 Claims. (Cl. 62—344)

Matter enclosed in heavy brackets [ ] appears in the original patent but forms no part of this reissue specification; matter printed in italics indicates the additions made by reissue.

This invention relates to dispensing units and, more particularly, to dispensing units which are particularly well adapted for dispensing ice, in bulk, in the form of charges of flake ice, or cracked or chipped ice.

It is a primary object of the present invention to provide a novel dispensing unit for dispensing individual charges of flake ice or cracked or chipped ice.

Another object is to afford a novel dispensing unit of the aforementioned type wherein ice may be stored therein, and dispensed therefrom in a novel and expeditious manner.

Another object of the present invention is to provide a novel dispensing unit of the aforementioned type embodying ice-making apparatus constituted and arranged therein in a novel and expeditious manner for making the ice to be stored in, and dispensed from, the unit.

In units heretofore known for storing ice and dispensing the same in individual charges of flake, chipped or cracked ice, the melt down resulting from the melting of the ice in storage has commonly been permitted to run off into a waste can or a waste tank, or into a drain. Such disposal of the melt down results in a loss of efficiency of the unit because of the loss of the thus disposed of melt down. It also results in a storage and service problem, where waste cans or tanks are used, because of the necessity of providing space for such waste cans, and the necessity of emptying them periodically. If such waste cans are not used under such conditions, the use of the unit is limited, because it can only be used in locations having a drain available for the melt down. It is an important object of this invention to overcome such difficulties.

Another object of the present invention is to afford a novel dispensing unit of the aforementioned type wherein the melt down does not afford a disposal problem.

A further object is to provide a novel dispensing unit of the aforementioned type wherein the melt down from the stored ice therein is refrozen into ice for use in the unit.

Yet another object of the present invention is to afford a novel dispensing unit of the aforementioned type wherein the melt down from the stored ice is used to precool the water stored in the unit and which is to be subsequently frozen into ice for use in the unit.

Another object is to afford a novel dispensing unit of the aforementioned type wherein the parts thereof are so constituted and arranged that the ice-making mechanism thereof affords cooling for the ice-storage portion thereof.

Another object of the present invention is to provide a novel dispensing unit of the aforementioned type wherein ice-making and ice-dispensing operations are controlled in a novel and expeditious manner.

A further object is to provide a novel dispensing unit of the aforementioned type which is relatively compact in size and is practical and efficient in construction and operation.

Another object is to provide a novel dispensing unit of the aforementioned type which may be readily serviced, and wherein the parts thereof may be readily disassembled and assembled in cleaning operations, and the like.

A further object of the present invention is to provide a novel unit of the aforementioned type for making, storing, and dispensing ice, which may be readily and economically produced commercially.

Other and further objects of the present invention will be apparent from the following description and claims and are illustrated in the accompanying drawings, which by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

Figure 1:
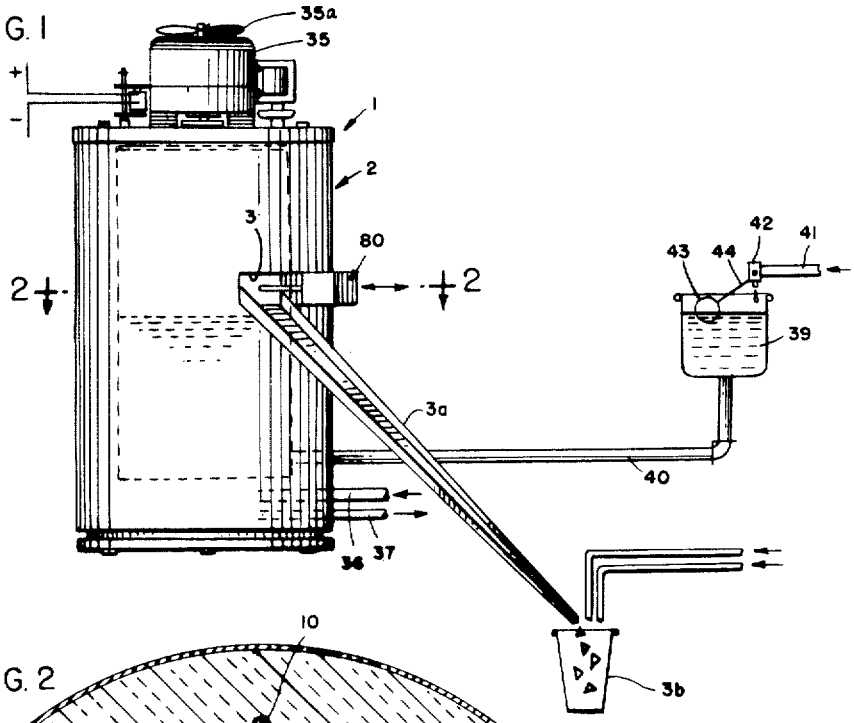
FIG. 1 is a front elevational view of a dispensing unit embodying the principles of the present invention, with certain associated parts shown diagrammatically.

A dispensing unit 1, embodying the principles of the present invention, is shown in the drawing to illustrate the preferred embodiment of the present invention.

In general, the dispensing unit 1 embodies an upright, substantially cylindrical-shaped housing or cabinet 2 wherein ice may be made in the lower end portion thereof, stored in the upper end portion thereof, and [disposed] *dispensed* in individual charges of flake ice, or cracked or chipped ice through an opening 3 in the housing. The dispensing unit 1 may be used for dispensing cracked ice in different locations such as, for example, in restaurants, or soda fountains, or the like, but it is particularly well adapted for use in coin-controlled automatic dispensing machines wherein cold drinks are dispensed into a cup, the dispensing unit 1 affording a novel and practical device for dispensing an individual charge of cracked or chipped ice into each cup of cold beverage dispensed from such machine.

Figure 2:
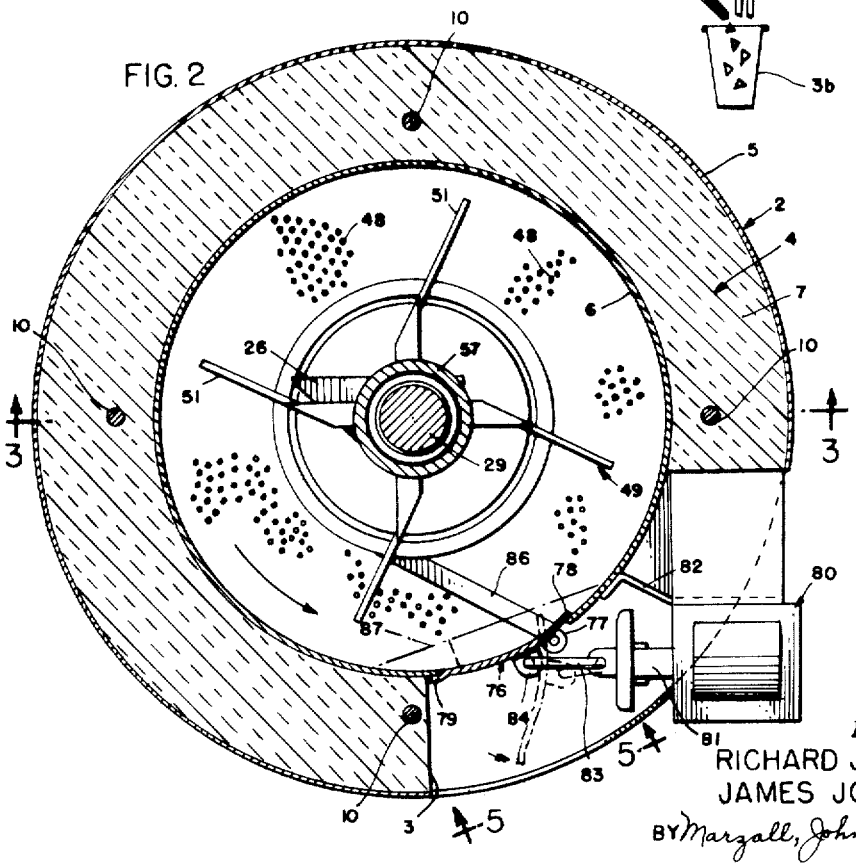
FIG. 2 is an enlarged transverse sectional view taken substantially along the line 2—2 in FIG. 1.
Figure 3:
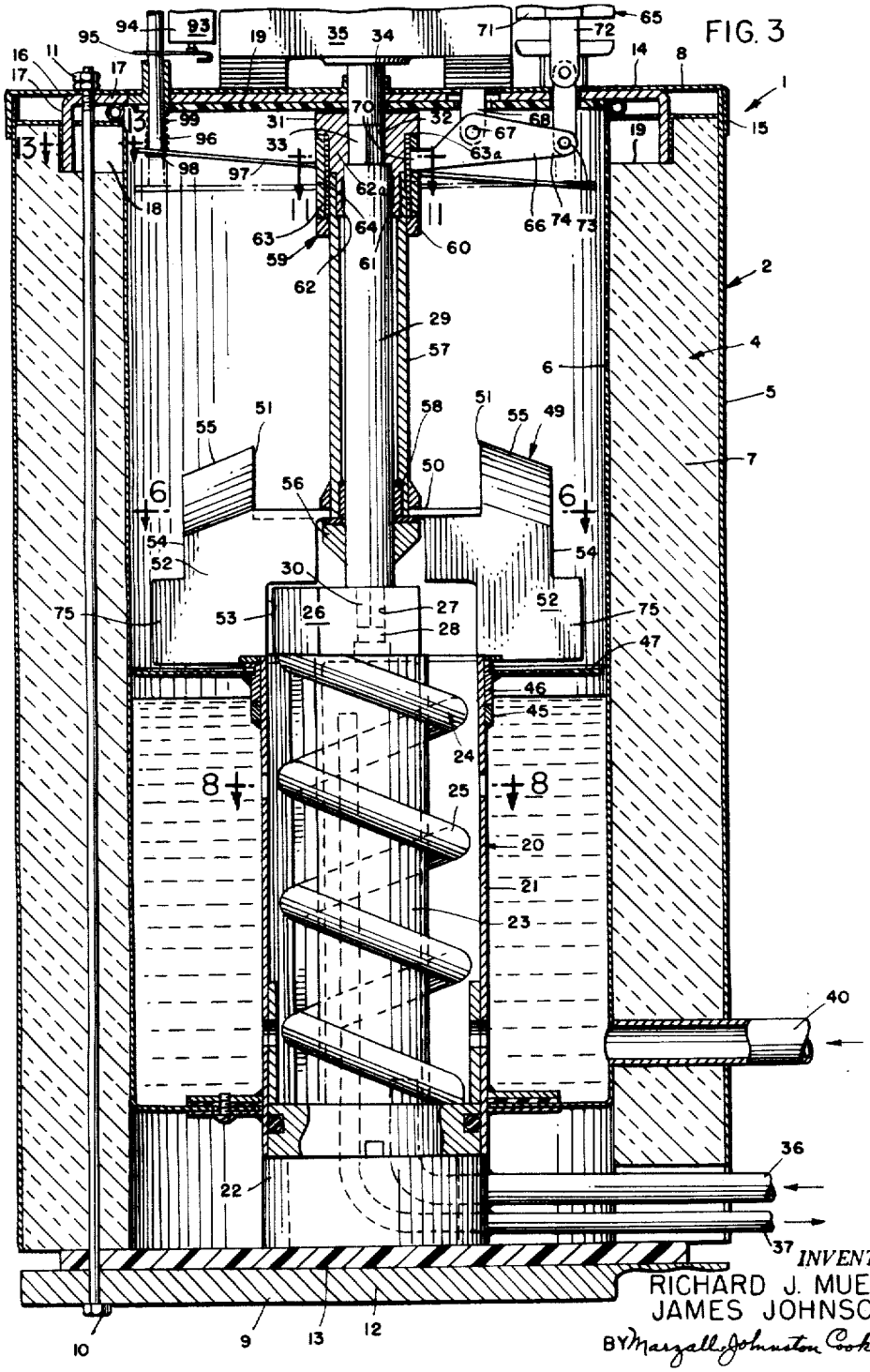
FIG. 3 is an enlarged fragmentary longitudinal sectional view of the unit shown in FIG. 1, taken substantially along the line 3—3 in FIG. 2.

The housing 2, shown in the drawings, embodies a substantially cylindrical-shaped side wall [7] *4* including a cylindrical-shaped outer member or cover 5 and a cylindrical-shaped inner liner 6, disposed in co-axial spaced relation to each other, with insulation 7 disposed between the member 5 and the liner 6, FIGS. 2 and 3. The outer member 5 and the inner liner 6 may be made of any suitable material such as, for example, sheet steel, and the insulation 7 may, likewise, be made of any suitable insulating material such as, for example, cork, foamed plastic, or the like.

The housing 2 also includes a top wall 8 and a bottom wall 9 mounted on the upper and lower ends of the side wall 4, respectively, and releasably secured in tight-closing relation thereto by means of tie-down bolts 10 extending upwardly through the bottom wall 9, the insulation 7 of the side wall 4, and the top wall 8, nuts 11 being threadedly engaged with the upper end portions of the tie-down bolts 10, and disposed in abutting engagement with the upper face of the top wall 8, FIG. 3.

The bottom wall 9 includes a round outer sheet *12* of suitable material such as, for example, plate steel, preferably having an outside diameter equal to the outside diameter of the side wall 4 of the housing 2. It also includes a liner 13 made of suitable material such as, for example, a suitable plastic such as, for example, Bakelite, mounted on the upper face of the sheet 12, in juxtaposition thereto, the liner 13 extending radially outwardly a sufficient distance that when the bottom wall 9 is clamped against the lower end of the side wall 4 the line 13 is clamped between the sheet 12 and the side wall portion 4, FIG. 3.

The top wall 8 is in the form of an inverted dish-shaped cover member having a round, flat body portion 14, from the peripheral edge portion of which an annular flange 15 depends. The flange 15 is of such diameter that when the cover member 8 is disposed in normal operative position on the side wall 4 of the housing 2, the flange 15 is disposed in closely fitting juxtaposition to the outer peripheral surface of the upper edge portion of the side wall 4, FIG. 3. The cover 8 also includes a round, flat, stainless-steel plate 16 secured to the lower face of the body portion 14 in centered relation thereto. The plate 16 has a plurality of spaced ears 17 projecting downwardly from the outer periphery thereof in spaced relation to each other, FIGS. 3 and [14] *13*. Each of the ears is disposed in a respective, substantially U-shaped bracket 18, secured to and projecting outwardly from the outer surface of the upper end portion of the liner 6, to thereby hold the cover 8 against rotation relative to the housing 2, when the cover 8 is disposed in normal position on the housing 2.

A liner 19, in the form of a flat round plate, is of such diameter and is mounted on the plate 16 in such position that, when the cover 8 is disposed in normal closing relation to the upper end of the housing 2, the liner 19 is disposed in the upper end of the liner 6 in relatively close fitting relation thereto. The portions 14 and 15 of the cover 8 may be made of any suitable material such as, for example, steel, and the liner 19 may also be made of any suitable material but is preferably made of a non-absorbent insulating material such as the aforementioned Bakelite.

An ice-making mechanism 20, of a type readily available on the market, is mounted in the lower end portion of the housing 2, FIG. 3. The ice-making mechanism 20 includes a cylindrical-shaped housing 21 which is open at the top and closed at the bottom. The housing 21 is disposed in upright position on the bottom wall 9 of the housing 2, in inwardly spaced, co-axial relation to the inner liner 6. The bottom wall 22 of the housing 21 includes a substantially inverted cup-shaped central portion 23 which projects upwardly into the housing 21 and terminates at its upper end in uniplanar relation to the upper edge of the housing 21. A feed screw [25] *24* at its lower end, is mounted in the housing 21, with the block [24] *26* resting on the upper end of the central portion 23, and with [the] *a* helical-shaped portion 25 *of feed screw 24* disposed around the central portion 23. The block 26 and the helical-shaped portion 25 may be made of any suitable material such as, for example, brass, and may be attached together by suitable means such as, for example, by brazing.

The block 26 has an opening 27 extending vertically therethrough, which, at least in the upper end portion thereof, is square in transverse cross-section. A plug 28 is mounted in the lower end portion of the opening 27 and may be brazed in position to close the lower end of the opening 27.

A drive shaft 29, having a square lower end portion 30, complementary in size and shape to the upper end portion of the opening 27, is mounted in upright position in the housing 2, with the lower end portion 30 disposed in the opening 27 to thereby drivingly connect the shaft 29 to the block 26. A sleeve 31 is mounted on the upper end of the drive shaft 29 and may be secured thereto by suitable means such as, for example, brazing. The drive shaft 29 extends only partially through the sleeve 31, and the sleeve 31, at its upper end, has an opening 32 therein which is disposed in axial alignment with the shaft 29. The opening 32 is square in transverse cross-section, and, when the dispensing unit is assembled for operation, the square lower end portion 33 of the drive shaft 34 of a motor 35, FIGS. 1 and 3, is disposed in the opening 32 in driving engagement with the sleeve 31. The motor 35 is mounted on the top wall 8, and is secured thereto with the drive shaft 34 extending through the central portion of the top wall 8, FIG. 3.

The block 26 of the feed screw 24 is disposed on the upper end of the upwardly projecting central portion 23 of the ice-making mechanism 20, in axial alignment therewith. It is freely movable on the central portion 23, and therefore, is horizontally rotatable around the longitudinal axis of the opening 27. The helical portion 25 of the feed screw 24 is connected to the block 26 in such position that when the block 26 is rotated around the longitudinal axis of the opening 27 on the upwardly projecting portion 23 of the housing 21, the helical portion 25 is rotated thereby around the upwardly projecting portion 23.

The operation of the motor 35 is such that when it is energized it rotates the drive shaft 34 in a counter-clockwise rotation as viewed when looking downwardly on the motor 35. Thus, it will be seen that with the drive shaft 34 connected through the sleeve 31 and the drive shaft 29 to the block 26, rotation of the drive shaft 34 by the motor 35 is effective to rotate the helical-shaped portion 25 of the feed screw 24 in a counter-clockwise direction around the upwardly projecting portion 23 of the ice-making mechanism 20.

Figure 12:
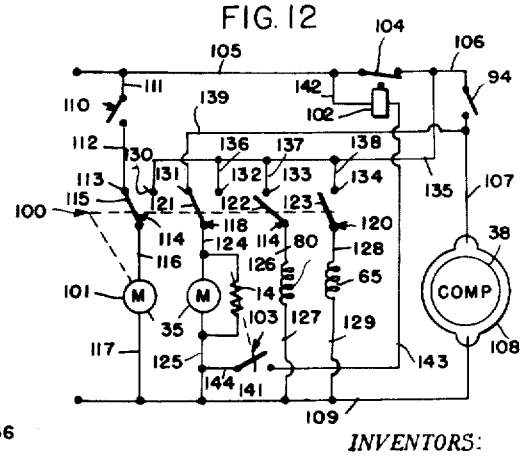
FIG. 12 is a wiring diagram for the dispensing unit shown in FIG. 1.

A refrigerant line, including a feed line 36 and a returning line 37, projects into the lower end portion of the central portion 23 of the ice-making mechanism 20, and is connected to a suitable refrigeration unit, including a compressor 38, FIG. 12, which may be mounted in any suitable location outside of the housing 2. A water supply tank 39, FIG. 1, is connected by a suitable conduit 40, extending from the bottom thereof, to the interior of the lower end portion of the housing 2. The supply tank 39 may be connected to a suitable source of water, not shown, by a conduit 41 mounted above the tank in position to discharge thereinto. A valve 42 is mounted on the discharge end of the conduit 41 and the opening and closing thereof is controlled by a float 43 connected to the valve 42 by an arm 44. The valve 42, the arm 44, and the float 43 are so disposed relative to each other that when the water in the tank 39 rises to the level shown in FIGS. 1 and 3, the float 43 and arm 44 are effective to close the valve 42. It will be seen that the level of the water in the housing 2, when the float is disposed in the last mentioned position, is such that the water fed therefrom into the housing 2 is disposed below but closely adjacent to the upper end of the housing 21 of the ice-making mechanism 20. When the water in the housing 2 falls below the aforementioned level, water flows from the tank 39 thereinto. The lowering of the water in the tank 39 caused by the flow of water therefrom into the housing 2, causes the valve 42 to open and thereby automatically feed more water from the conduit 41 through the valve 42 into the tank 39. Openings 21a in the housing 21 of the ice-making mechanism 20 permits water in the housing 2 to flow into the housing 21 to thereby substantially fill the latter.

An annular supporting ring 45 is mounted on and attached to the outer face of the housing 21 of the ice-making mechanism 20 by suitable means such as, for example, brazing, and is disposed thereon in downwardly spaced relation to the upper edge thereof, FIG. 3. A sleeve 46 is mounted on the upper end portion of the housing 21, above the ring 45, and is supported by the latter. The sleeve 46 has a relatively [snug but freely slidable] *tight* fit on the housing 21, and is of such width that when it rests on the ring 45, the upper edge of the sleeve 46 terminates in uniplanar relation to the upper edge of the housing 21.

Figure 7:
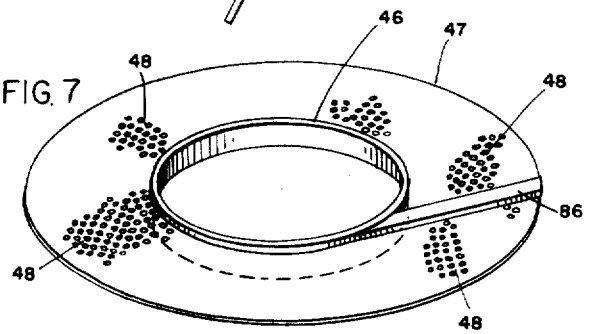
FIG. 7 is a top perspective view of a portion of the mechanism shown in FIG. 3.
Figure 8:
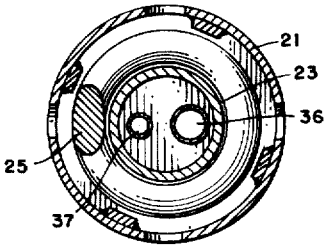
FIG. 8 is a detail sectional view taken substantially along the line 8—8 in FIG. 3.
Figure 13:
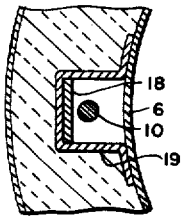
FIG. 13 is a detail sectional view taken substantially along the line 13—13 in FIG. 3.

A *stationary* partition wall 47 in the form of an annular-shaped plate, FIGS. 3 and 7, is mounted on and extends around the sleeve 46. The partition wall 47 is attached to the sleeve 46 by suitable means such as, for example, brazing or welding, and has a plurality of perforations 48 therethrough for a purpose which will be discussed in greater detail presently. It is of such width that when it is disposed in the aforementioned operative position on the housing 21, it terminates at its outer peripheral edge portion in closely adjacent relation to the inner liner 6 of the side wall 4 of the housing 2, FIG. 3.

The helical-shaped portion 25 of the feed screw 24 is disposed between the upwardly projecting central portion 23 of the bottom wall 22 of the ice-making mechanism 20, and the adjacent side wall portions of the housing 21 thereof. When refrigerant is fed through the lines 36 and 37 into the central portion 23 with water disposed in the housing 21, and with the motor 35 energized, ice is continuously formed on the outer face of the upwardly projecting portion 23 of the ice-making mechanism 20, and the rotation of helix 25 of the feed screw 24 around the upwardly projecting portion 23 is effective to continuously break the ice so formed from the outer surface theerof and feed the ice upwardly through the upper end portion of the housing 21. The water in the housing 21 also helps to float the thus formed ice upwardly, and as water is converted into ice, additional water is automatically fed into the housing 2, and therefore, into the housing 21, from the tank 39. As the ice thus formed in the ice-making mechanism 20 is moved upwardly by the helix 25 and the floating action of the water in the housing 2, the block 26, which is rotated with the drive shaft 29 and the helix 25, sweeps it radially outwardly onto the partition wall 47. As ice continues to be made by the ice-making mechanism 20, the ice pushes upwardly into the upper end portion of the housing 2, control mechanism being afforded in the housing 2 for shutting off the compressor 38 when the upper end portion of the housing 2 is filled to the desired level with ice, as will be discussed in greater detail presently.

Figure 4:
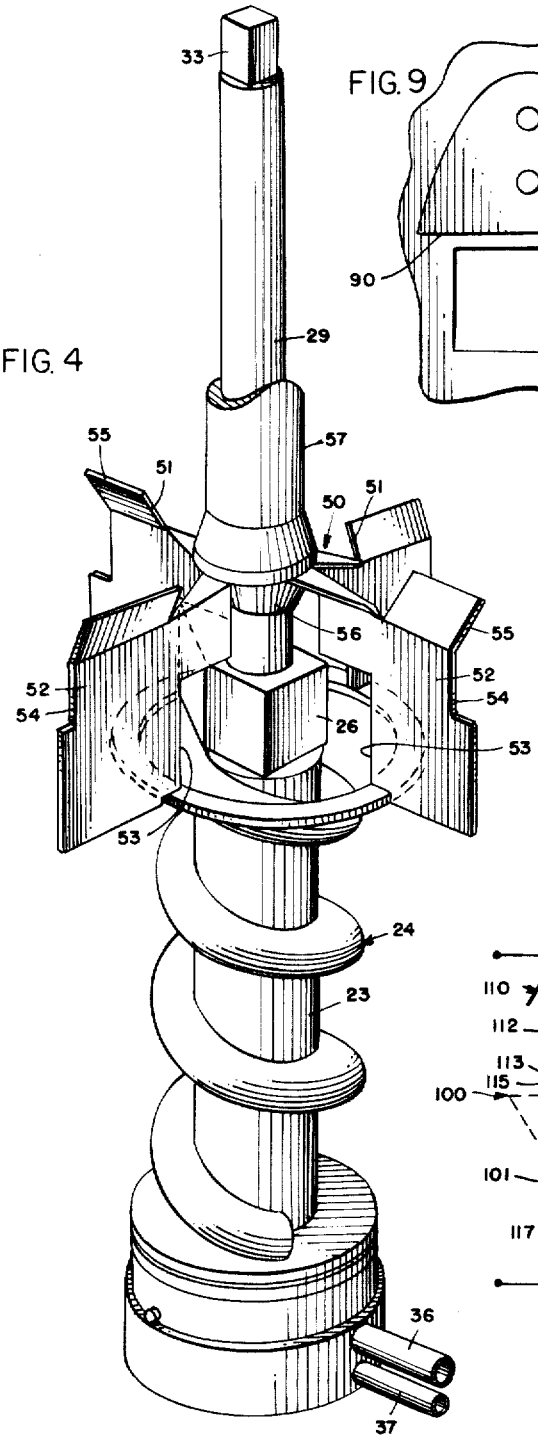
FIG. 4 is an enlarged perspective view of a portion of the mechanism shown in FIG. 3.

A paddle wheel 49, having a hub portion in the form of a relatively thin annular ring 50 disposed at the upper end thereof, is mounted on the drive shaft 29 in spaced relation thereto, FIGS. 2, 3, and 4. The paddle wheel 49 includes four blades or vanes 51 projecting horizontally outwardly from the hub portion 50 in planes substantially tangential thereto, above the *stationary* partition wall 47. The lower edge portions of the vanes [50 are secured to] *51 rest slideably on* the upper edge portion of the ring 46 [by suitable means such as welding or brazing].

The vanes 51 of the paddle wheel 49 are identical in construction, each embodying a body portion 52 having a recess 53 formed in the bottom portion of the inner edge portion thereof, and a recess 54 formed in the upper portion of the outer edge portion thereof. A flange 55 projects from the upper edge portion of the body member 52 of each of the vanes 51, the flanges 55 being disposed at an obtuse angle to the body portions 52, the angle opening in the direction of rotation of the drive shaft 29 by the motor 35.

A supporting member 56 is mounted on and attached to the drive shaft 29, and a sleeve 57 is rotatably mounted on the drive shaft 29 above the supporting member 56, and rests thereon. The hub 50 of the paddle wheel 49 is secured to the lower end portion of the sleeve 57 by suitable means such as welding or brazing. The upper end portion of the sleeve 57 is disposed around the lower end portion of the sleeve 31, and the lower end portion of the sleeve 57 is disposed around a bearing 58, whereby the sleeve 57 is maintained in spaced relation to the drive shaft 29 by the sleeve 31 and the bearing 58.

A spring clutch 59 is mounted on the upper end portion of the drive shaft 29 for controlling the coupling of the sleeve 57 to the motor 35, to thereby control the rotation of the paddle wheel 49. The spring clutch 59 includes a supporting collar 60 mounted on and secured to the upper end portion of the sleeve 57 immediately below the sleeve 31. The upper end portion 61 of the sleeve 57 disposed above the ring 60 is rotatably mounted on the lower end portion 62 of the sleeve 31, and is of the same outside diameter as the upper end portion 62a of the sleeve 31. A coil spring 63, preferably made of square spring steel, *and coiled in a direction opposite the direction of rotation of the end portions 61 and 62*, is mounted around the portion 61 of the sleeve 57 and the portion 62a of the sleeve 31, and a cylindrical-shaped sleeve 64 is mounted around coil spring 63 in enclosing relation thereto. The upper end 63a of the coil spring 63 projects outwardly through the sleeve 64 to thereby connect the spring 63 to the sleeve 64 for rotation therewith.

The spring 63 is of such size, and the sleeve 64 is so disposed relative to the portions 62 and 61 of the sleeve 31 and the sleeve 57, respectively, that when the drive shaft 34 of the motor 35 is rotated in its previously mentioned normal direction of rotation, and [no external inward pressure is exerted on the spring 63,] *the sleeve 64 is free to rotate* the clutch 59, through the gripping action of the spring 63, is effective to couple the sleeve 31 to the sleeve 57, whereby the sleeve 57 rotates with the drive shaft 34 of the motor 35, and, therefore, with the drive shaft 29. However, when [an external inward pressure is applied to the periphery of the spring 63,] *the sleeve is prevented from rotation*, the spring 63 is rendered ineffective to couple the sleeve 31 to the sleeve 57 and, therefore, the shafts 34 and 29 may be freed for such rotation without correspondingly rotating the sleeve 57.

Figure 11:
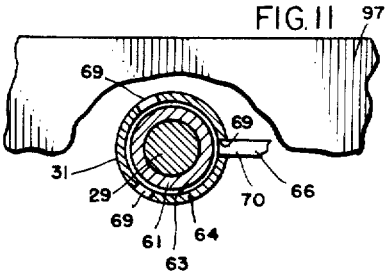
FIG. 11 is a detail sectional view taken substantially along the line 11—11 in FIG. 3.

To control the actuation of the clutch 59, a control mechanism 65 is mounted on the top wall 8 of the housing 2 of the dispenser 1. The control mechanism 65 includes a lever 66 pivotally mounted by a pin 67 on a supporting member 68 depending from the top wall 8. The sleeve 64 has three openings therethrough, the openings 69 being equally spaced around the periphery of the sleeve 34 in uniplanar relation to each other, FIG. 11. One end portion 70 of the lever 66 is normally disposed in one of the openings 69 [in position to press the spring 63 into clutch disengaging position], as shown in FIG. 3, *to prevent the sleeve from rotating.*

A solenoid 71, including a plunger 72, is mounted on the top wall 8 of the housing 2, and the lower end portion of the plunger 72 is pivotally connected by a pin 73 to the other end portion 74 of the lever 66. When the solenoid is not energized, the plunger 72 is disposed in lowermost position as shown in FIG. 3, and the lever 66 is disposed in the aforementioned position wherein the end 70 thereof is effective to [press against the coil spring 63 to] *engage the sleeve and* disengage the clutch 59. However, when the solenoid 71 is energized, the plunger 72 is moved upwardly to thereby pivot the lever 66 in a counter-clockwise direction, as viewed in FIG. 3, and thereby pivot the end portion 70 of the lever 66 downwardly out of engagement with the sleeve 64. The movement of the end portion 70 of the lever 66 out of engagement with the coil spring 63 is effective to permit the spring 63 to seize the sleeves 31 and 57 and thereby couple the sleeve 31 to the sleeve 57.

Thus it will be seen that actuation of the clutch 59 may be controlled by energizing and de-energizing the solenoid 71.

The bottom of the body portion 52 of the vanes 51 of the paddle wheel 49 are secured to the ring 46 by suitable means such as brazing or welding, so that it is connected to the partition wall 47. Thus, when the sleeve 57 is rotated by the motor 35, the paddle wheel 49 and [the partition wall 47] *feed screw 24* are rotated therewith.

The lower outer edge portions 75 of the vanes 51 project outwardly beyond the remainder thereof, FIGS. 3 and 4, and are of the same height as the opening 3 in the side wall 4 of the housing 2. When the paddle wheel 49 is disposed in operative position on the drive shaft 29, they are disposed in horizontal alignment with the opening 3 inwardly of the liner 6 in position to urge the ice resting on the partition wall 47 outwardly toward the liner 6 and, therefore, outwardly through the opening 3 during rotation of the paddle wheel 49.

Figure 5:
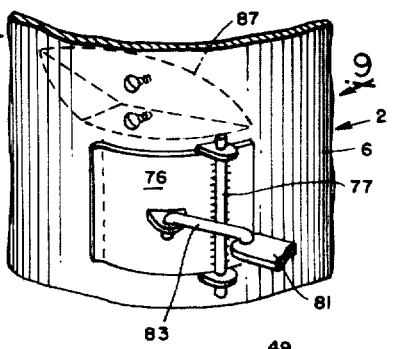
FIG. 5 is an enlarged, fragmentary, detail elevational view of a portion of the dispensing unit shown in FIG. 1.
Figure 6:
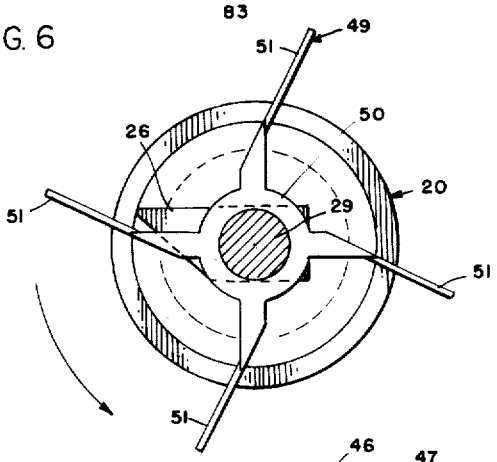
FIG. 6 is a detail sectional view taken substantially along the line 6—6 in FIG. 3.

A door 76, FIGS. 2 and 5, is pivotally mounted by a hinge 77 on the housing 2 for horizontal swinging movement between open and closed position relative to the opening 3. When the door 76 is disposed in closed position relative to the opening 3, one lateral edge 78 thereof is disposed in juxtaposition to the inner face of the inner liner 6 of the housing 2, and the other lateral edge 79 thereof is disposed in juxtaposition to the outer face of a portion of the inner liner 6 of the housing 2, FIG. 2. A solenoid 80, including a plunger 81, is mounted on the housing 2 by a bracket 82, and the plunger 81 is connected by a link 83 to an ear 84 projecting outwardly from the door 76. The plunger 81 is disposed in outwardly projecting position when the solenoid 80 is not energized, and is disposed in retracted position when the solenoid 80 is energized. The solenoid 80 is so disposed relative to the door 76 that when it is de-energized, the plunger 81 through the link 83 is effective to hold the door 76 in closed position, and when the solenoid 80 is energized, the plunger 81 is effective to rotate the door in a counter-clockwise direction, as viewed in FIG. 2, into open position as shown in broken lines in FIG. 2. When the door 76 is disposed in open position, the lateral edge portion 78 thereof projects inwardly into the housing 2 at the far side of the opening 3, as considered in connection with the direction of rotation of paddle wheel 49, to afford a deflector member for deflecting ice outwardly through the opening 3 in the operation of the dispenser 1, as will be described in greater detail presently. It will be remembered that the outer end portion 75 of the vanes 51 of the paddle wheel 49 are disposed in inwardly spaced relation to the inner liner 6 of the housing 2, and the spacing at the end portion 75 from the inner liner 6 is such that they clear the lateral edge portion 78 of the door 76 in closely adjacent relation thereto, when the door 76 is in the aforementioned open position.

It will be remembered that when the clutch 59 is engaged, and the motor 35 is energized, the sleeve 57 rotates with the drive shaft 29 in a counter-clockwise direction as viewed in FIG. 2. Such rotation of the sleeve 57 is effective to correspondingly rotate the paddle wheel 49, the [panes] *vanes* 51 thereof moving past the opening 3 in a counter-clockwise direction, as viewed in FIG. 2, and being effective to push ice carried by the partition wall 47 outwardly through the opening, the lateral edge portion 78 of the door 76 acting as a deflecting member for deflecting the ice to be discharged outwardly through the opening 3. The partition wall 47 has a raised rib 86 mounted on the extending across the upper face thereof, the rib 86 acting as an abutment member biting into and engaging the lower surface of the ice which is [disposed on] *being moved about* the upper face of the *stationary* partition wall 47 [so as to insure that the ice disposed on the partition wall 47 rotates therewith].

Figure 9:
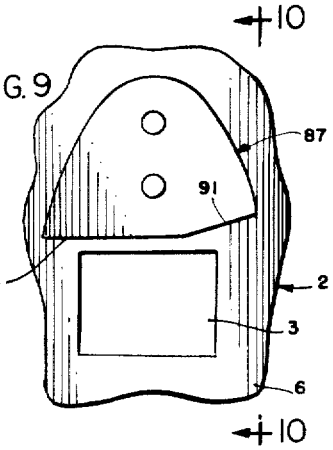
FIG. 9 is a fragmentary, detail elevational view of the portion of the mechanism shown in FIG. 5, but looking in the opposite direction to that of FIG. 5.
Figure 10:
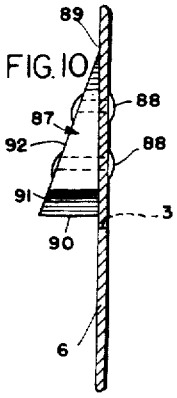
FIG. 10 is a detail sectional view taken substantially along the line 10—10 in FIG. 9.

Another deflector member 87, FIGS. 5, 9, and 10, is mounted on the inner liner 6 of the housing 2 above the opening 3 in such position that it projects into the housing 2 above, but in closely adjacent relation to the path of travel of the outer end portions 75 of the vanes 51, the recesses 54 affording clearance for this positioning of the deflector 87. The deflector member 87 is secured to the inner liner 6 by suitable means such as rivets 88, and is substantially wedge-shaped, tapering inwardly and downwardly at a downwardly opening acute angle from a relatively narrow upper edge 89 to a wider bottom edge 90. The deflector member 87 terminates at its bottom edge 90 in upwardly spaced, but closely adjacent relation, to the opening 3 in the housing 2, FIG. 9. As may be seen in FIG. 9, the major portion of the bottom edge 90 of the deflector member 87 is disposed in substantially horizontally extending position. However, the right end portion 91 thereof, as viewed in FIG. 9, projects upwardly at an acute angle to the plane of the remainder of the bottom end 90. Thus, it will be seen that as ice is moved with [the partition wall 47 and] the paddle wheel 49, during rotation thereof, the ice adjacent to the inner liner 6, immediately above the opening 3, is deflected downwardly by the end portion 91 of the bottom 90 of the wedge 87, and the ice immediately adjacent to the inner liner 6, disposed above the bottom 90 of the deflector 87, is deflected upwardly and inwardly by the inner face 92 of the deflector member 87. This action of the deflector member 87 is effective to break the ice disposed above the opening 3 loose from the ice [moving past] *being moved toward* the opening 3 [with the partition wall 47 and] *by the rotation of* the paddle wheel 49, so that the latter ice may be readily deflected outwardly by the action of the vanes 51 of the paddle wheel 49 and the lateral edge portion 78 of the door 76. The upper face of the partition wall 47 is preferably disposed in the same horizontal plane as the lower edge of the opening 3, and, therefore, it will be seen that the ice to be discharged through the opening 3, may be readily so discharged, when it is thus broken loose from the surrounding ice.

The ice thus discharged through the opening 3 may, of course, be discharged into any suitable receptacle. For example, in a vending machine of the aforementioned type for vending cool drinks, the ice thus discharged may be discharged into a chute such as the chute 3a shown diagrammatically in FIG. 1, and through which chute it may slide downwardly from the opening 3 into a suitable receptacle such as a cup 3b shown diagrammatically in FIG. 1.

The dispenser unit 1 also includes control mechanism 93, FIG. 3, for controlling the operation of the compressor 38 in such a manner that when the upper end portion of the housing 2 is filled to the desired level with ice, further operation of the compressor 38, and, therefore, of the ice-making mechanism 20, is prevented, the control mechanism 93 being effective in the normal operation of the dispenser unit 1, to energize the ice-making mechanism 20 when the level of the ice in the housing 2 is below the desired level, as will be discussed in greater detail presently. The control mechanism 93 includes a switch 94 mounted on the top wall 8 of the housing 2, the switch 94 having an actuating member 95, including a plunger 96, which projects downwardly through the top wall 8 of the housing 2, FIG. 3. One end portion of an elongated plate 97 is mounted on the lower end portion of the plunger 96, and is held thereon by a retainer ring 98. The other end portion of the plate 97 underlies the plunger 72 of the solenoid 71. A compression spring 99 is mounted around the plunger 96 and disposed between the top 8 of the housing 2 and the upper face of the plate 97 in position to urge the plunger 96 downwardly toward switch-closing position.

The switch 94 is of a snap-acting type which is effective to close as the plate 97 moves into the lowered position shown in broken lines in FIG. 3 from the raised position shown in solid lines therein, and is effective to open when the plunger 98 moves into the raised position shown in solid lines in FIG. 3 from the lowered position shown in broken lines therein.

With this construction, it will be seen that when ice is disposed in the housing 2 to a level sufficient to hold the plate 97 in the raised position shown in solid lines in FIG. 3, the switch 94 is open to thereby prevent actuation of the compressor 38. However, when the level of the ice in the housing 2 falls from the desired position to a sufficiently low level that the plate 97 is permitted to drop downwardly into the position shown in broken lines in FIG. 3, the switch 94 is closed to thereby permit energization of the compressor 38, and the motor 35 and thereby feed more ice into the upper end portion of the housing 2, as will be discussed presently.

*Operation*

In the operation of the novel dispenser 1, the ice-making mechanism 20 is operable independently of the ice-dispensing mechanism, so that the upper end portion of the housing 2 may be kept filled with ice to the desired level even though the ice-dispensing mechanism is not operated. Also, it will be seen that the ice stored on the partition wall 47 is disposed in such position in the housing 2 that any melt down thereof flows downwardly through the perforations 48 in the partition wall 47 into the water in the bottom of the housing 2. This, it will be seen, is advantageous from the standpoint of disposing of the melt down without requiring a drain can, or the like. However, it is also advantageous in that the melt down, which is only slightly above the freezing point of water, aids in cooling the water to be frozen by the freezing mechanism 20 and is, in fact, itself refrozen in subsequent operation of the freezing mechanism 20.

The dispenser unit 1 includes a timing mechanism, which may be of any one of several types well known in the art, and readily available on the market, such as, for example, the timing mechanism 100 shown diagrammatically in FIG. 12, and which includes a timing motor 101. As will be discussed in greater detail presently, the timing mechanism 100 is so connected to the motor 35, that when the motor 35 is energized for an ice-discharging cycle of operation, the solenoid 71 is energized only for a sufficient length of time to permit the sleeve 57 to be rotated through two-thirds of a complete revolution. The control mechanism 100 may be mounted in any convenient place outside of the housing 2, such as, for example, in the cabinet of a vending machine of the aforementioned type, in which our dispenser 1 may be used.

A thermo overload device [102] which includes a relay 102 controlled by a heat-sensitive switch 103, FIG. 12, is preferably associated with the motor 35, so that if the motor 35 is run for a sufficiently prolonged period of time, or is sufficiently overloaded, that excessive heating thereof is caused, the relay 102 may be energized to thereby open the circuit to the motor 35 and de-energize the same, until the overheated condition has been eliminated. The relay 102 and the switch 103 may be included in the control circuit for the dispenser unit 1, such as that shown diagrammatically in FIG. 12, which will now be discussed.

It will be seen, as shown in FIG. 12, that the contacts 104 of the relay 102 are normally closed, and one side thereof may be connected by a suitable conductor 105 to a suitable source of electric power, not shown. The other side of the contacts 104 may be connected by a conductor 106, the switch 94, and a conductor 107, to one side of the motor 108 which operates the compressor 38, and the other side of the motor 108 may be connected by a conductor 109 to the other side of the aforementioned source of power, not shown. Thus, it will be seen that with the switch contacts 104 disposed in normally closed position, closing the switch 94 is effective to energize the motor driving the compressor 38, and the opening of the switch 94 is effective to de-energize the same.

One side of a normally open control switch 110, which may be of any desirable type, such as, for example, a manually-operated switch, or a coin-operated switch, is connected through a conductor 111 and the line 106. The other side of the switch 110 is connected by a conductor 112 to one contact 113 of a double throw switch 114, the switch blade 115 of the double throw switch 114 being connected by a conductor 116 to one side of the timer motor 40, and the other side of the timer motor [40] *101* being connected by a conductor 117 to the line 109. The blade 115 of the switch 114 is normally engaged with the contact 113 and, therefore, it will be seen that closure of the switch 110 is effective to energize the motor 101, and thus start operation of the timing mechanism 100.

In addition to the double throw switch 114, the timing mechanism 100 includes three other double throw switches, 118, 119, and 120. The blades 121, 122, and 123 of the switches 118–120, respectively, are, at all times, directly connected to one side of the motor 35, one side of the door actuating solenoid 80, and one side of the clutch control solenoid [95] *65*, respectively. Thus, it will be seen that the blade 121 of the switch 118 is connected through a conductor 124 to one side of the motor 35, and the other side of the motor 35 is connected by a conductor 125 to the line 109; the blade 122 of the switch 119 is connected by a conductor 126 to one side of the door-actuating solenoid 80, and the other side of the solenoid 80 is connected by a conductor 127 to the line 109; and the blade 123 of the switch 120 is connected by a conductor 128 to one side of the clutch-control solenoid 65, and the other side of the solenoid 65 is connected by a conductor 129 to the line 109.

In addition to the contact 113, the double throw switch 114 includes a contact 130. Likewise, the switch 118 includes two contacts 131 and 132. The switch 119 includes a contact 133 and the switch 120 includes a contact 134.

When the timing mechanism 100 is in its normal, de-energized position, the blades 115 and 121 of the switches 114 and 118, respectively, are disposed in engagement with the contacts 113 and 131, respectively, and the blades 122 and 123 of the switches 119 and 120, respectively, are disposed in open position relative to the contacts 133 and 134, respectively, as shown in FIG. 12. When the motor 101 is energized by the closing of the switch [115] *110*, to thereby actuate the timing mechanism 100, the blades 115 and 121–123 are moved thereby to the right, as viewed in FIG. 12, into engagement with the contacts [131–134] *130 and 132–134*, respectively. This, of course, breaks the circuit through the switch 110 and the timing motor 101. However, the movement of the blade 115 into engagement with the contact 130 of the switch 114 sets up a new circuit from the line [106] *105*, through the normally closed switch 104, a conductor 135, the contact 130, the blade 115, the conductor 116, the timing motor 101, and the conductor 117, to the other line 109.

The aforementioned actuation of the timing mechanism 100 is also effective to energize the motor 35, the door actuating solenoid 80, and the clutch actuating solenoid 65. The circuit for the motor 35, in this instance, extends from the line 105, through the normally closed switch 104, the conductor 135, [a conductor 136,] the contact *132* [131], the switch blade 121, the conductor 124, to one side of the motor 35, and from the other side of the motor through the conductor 125 to the other line 109. It will be noted that the contacts 133 and 134 of the switches 119 and 120 which control the energization of the solenoids 80 and 65, respectively, are likewise connected to the conductor 135 by conductors 137 and 138, respectively, so that they are likewise connected between the lines 105 and 109.

Thus it will be seen that when the timing mechanism 100 is actuated to move the switch blades 115 and 121–123 to the right, as viewed in FIG. 12, the motor 35 is energized to thereby drive the drive shaft 29. Also, at the same time, the solenoid 65 is energized to thereby withdraw the lever 66 from clutch-engaging position and permit the clutch 59 to couple the sleeves 31 and 57 together. The coupling of the sleeves 31 and 57 together is effective to connect the sleeve 57 and, therefore, the paddle wheel 49 to the drive shaft 29 for rotation therewith. At this same time, the solenoid 80 is energized by the closing of the switch *119* [120] to thereby cause the door 76 on the discharge opening 3 to be opened. Therefore, the rotation of the paddle wheel 49 is effective to discharge ice outwardly through the opening 3.

The timing mechanism 100 is so set that the switch blades 115 and 121–123 are held to the right, as viewed in FIG. 12, during substantially two-thirds of a revolution of the sleeve 57. Near the end of such two-thirds of a rotation of the sleeve 57, the timing mechanism 100 moves the blades 115 and 121–123 to the left, as viewed in FIG. 12, out of engagement with the contacts 130 and 132–134, respectively, to thereby break the circuits through the motor 35 and the solenoids 80 and 65 from the line 105 to the line 109, the switch 110 being open at this time.

The de-energization of the solenoid 65 is effective to cause the lever 66 to pivot in a clockwise direction, as viewed in FIG. 3, into position to engage in the opening 69 disposed two-thirds of the way around the periphery of the sleeve 57 from the opening 69 in which the lever 66 was engaged at the start of the cycle of operation. This movement of the lever 66 into the new opening 69 is effective to press the spring 63 of the clutch 59 inwardly to thereby disengage the sleeve 57 from the drive shaft 29 and stop rotation of the sleeve 57 and the paddle wheel 49.

The de-energization of the solenoid 80 is effective to close the door 76. Also, the breaking of the circuit between the conductor 135 and the motor 35, if the switch 94 is open, is effective to de-energize the motor 35 and thereby stop rotation of the drive shaft 29 and the helix 25. However, it will be noted that when the switch blade 115 moves to the left, as viewed in FIG. 12, out of engagement with the contact *130* [131], it moves into engagement with the contact 113. Therefore, if the switch 94 is closed, calling for more ice, so that the compressor 38 is operating, the motor 35 remains energized, to thus rotate the drive shaft 29 and the helix 25, and cause the ice being frozen in the ice-making mechanism 20 to be fed upwardly into the upper end portion of the housing 2. This circuit through the motor 35 for this latter operation extends from the line 105 through the normally closed switch 104, the conductor 106, the then closed switch 94, the conductor 107, a conductor 139, the contact 131, the switch blade 121, the conductor 124, to one side of the motor 35, and from the other side of the motor 35, through the conductor 125 to the other line 109.

From the foregoing it will be seen that whenever the compressor 38 is operating, the motor 35 is energized so that the ice made in the ice-making mechanism 20 is fed upwardly into the upper end portion of the housing 2. On the other hand, during an ice-dispensing cycle of operation, the motor 35 is also energized, irrespective of whether or not the compressor 38 is being actuated.

The heat-sensitive switch 103 of the thermo overload relay 102 includes a heating element 140 which is connected to the conductors 124 and 125 in parallel to the motor 35, so that whenever the motor 35 is energized the heating element 140 is also energized. The contacts 141 of the switch 103 are of the bi-metal type, which are open when the temperature thereof is below a predetermined temperature, but which are operable to close when the temperature thereof is above a predetermined temperature.

The motor 35 includes a fan 35a, which is so disposed thereon that when the motor is running at normal speed it provides sufficient circulation of air adjacent to the heating element 140 that the latter is ineffective to heat the contacts 141, to a sufficiently high temperature to cause them to close. However, if the motor, for any reason, should become stalled and thereby stop rotation of the fan 35a, the heating element 140 is effective to heat the contacts 141 to a sufficiently high temperature to cause them to close.

The closing of the contacts 141 is effective to energize the thermo overload relay 102, this circuit extending from the line 105 through a conductor 142 to one side of the windings of the relay 102, and from the other side of the windings of the relay 102 through a conductor 143, the contacts 141, a conductor 144, and the conductor 125, to the other line 109. The energization of the relay 102 is effective to move the normally closed contacts 104 into open position, to thereby break the circuit to the motor 35 irrespective of whether or not that circuit includes the conductor 135 and the contact 132, or the conductor 139 and the contact 131. Thus, it will be seen that if the motor 35 becomes stalled, the thermo overload relay 102 prevents it from being energized until such time as the stalled condition is rectified.

From the foregoing it will be seen that the present invention affords a novel [in] dispensing machine wherein ice may be made, stored, and dispensed in a novel and expeditious manner.

Also, it will be seen that the present invention affords a novel dispenser unit for ice, which is compact in size, and practical and efficient in operation.

Also, it will be seen that the present invention affords an ice dispenser unit wherein the problems related to the disposal of melt down from the ice stored therein are eliminated.

Also, it will be seen that the present invention affords a novel [in] dispenser which is well adapted for use in a coin-operated drink vending machine, and the like.

In addition, it will be seen that the present invention affords a novel ice dispenser unit which may be readily and economically produced commercially.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:

[1. A dispensing unit for ice comprising means for storing a supply of flake ice, an opening in said means, and means for discharging ice from said first mentioned means outwardly through said opening, said discharging means including means for rotating ice around the inside of said first mentioned means, and means in said first mentioned means for deflecting ice outwardly through said opening, said deflecting means comprising a deflecting member disposed in horizontal alignment with said opening, and another deflecting member disposed above said opening.]

2. A dispensing unit for ice comprising means for storing a supply of flake ice, an opening in said means, and means for discharging ice from said first mentioned means outwardly through said opening, said discharging means including means for rotating ice around the inside of said first mentioned means, and means in said first mentioned means for deflecting ice outwardly through said opening, said deflecting means comprising a deflecting member disposed in horizontal alignment with said opening, and another deflecting member disposed above said opening, said other deflecting member having a bottom surface slanting downwardly in the general direction of the path of travel of said rotating ice at an acute angle to the horizontal, and a horizontally inwardly disposed surface sloping downwardly and inwardly toward the center of rotation of said ice at an acute angle to the vertical.

[3. A dispensing unit for ice comprising a housing, means, including another housing, mounted in the lower end portion of said first mentioned housing for making ice and discharging it into the upper end portion of said first mentioned housing for storage, and means in said upper end portion for discharging individual charges of ice horizontally outwardly from said upper end portion.]

4. A dispensing unit for ice comprising a housing, means, including another housing, mounted in the lower end portion of said first mentioned housing for making ice and discharging it into the upper end portion of said first mentioned housing for storage, said means including a rotatable member for feeding said ice upwardly into said upper end portion, and means operatively connected to said member and rotatable therewith for discharging ice outwardly from said upper end portion.

5. A dispensing unit for ice comprising a housing, ice making means mounted in the lower end portion of said housing, said means including another housing mounted in said lower end portion, and a helical-shaped member rotatably mounted in said other housing in position to feed made ice from said lower end portion into the upper end portion of said first mentioned housing for storage upon rotation of said helical-shaped member, means rotatably mounted in said upper end portion in position to discharge said made ice outwardly from said upper end portion upon rotation of said rotatable means, and means operatively connected to said member and said rotatable means for simultaneously rotating the same.

6. A dispensing unit for ice comprising a housing, ice making means mounted in the lower end portion of said housing, said means including another housing mounted in said lower end portion, and a helical-shaped member rotatably mounted in said other housing in position to feed made ice from said lower end portion into the upper end portion of said first mentioned housing for storage upon rotation of said helical-shaped member, means rotatably mounted in said upper end portion in position to discharge said made ice outwardly from said upper end portion upon rotation of said rotatable means, a drive shaft connected to said member and said rotatable means in longitudinal alignment with the axis of rotation thereof and operable upon rotation to so rotate said member and said rotatable means, and means mounted on said housing for rotating said drive shaft.

7. A dispensing unit for ice comprising a housing, ice making means mounted in the lower end portion of said housing, said means including another housing mounted in said lower end portion, and a helical-shaped member rotatably mounted in said other housing in position to feed made ice from said lower end portion into the upper end portion of said first mentioned housing for storage upon rotation of said helical-shaped member, means rotatably mounted in said upper end portion in position to discharge said made ice outwardly from said upper end portion upon rotation of said rotatable means, a drive shaft connected to said member and operable upon rotation to so rotate said member, means mounted on said first mentioned housing for rotating said drive shaft, and clutch means connected to said drive shaft and said rotatable means for selectively operatively connecting and disconnecting said drive shaft and said rotatable means.

8. A dispensing unit for ice comprising a housing, ice making means mounted in the lower end portion of said housing, said means including another housing mounted in said lower end portion, and a helical-shaped member rotatably mounted in said other housing in position to feed made ice from said lower end portion into the upper end portion of said first mentioned housing for storage upon rotation of said helical-shaped member, means rotatably mounted in said upper end portion in position to discharge said made ice outwardly from said upper end portion upon rotation of said rotatable means, a drive shaft connected to said member and operable upon rotation to so rotate said member, said drive shaft extending along the axis of rotation of said rotatable means, means mounted on said first mentioned housing for rotating said drive shaft, and spring clutch means disposed between said drive shaft and said rotatable means in position to selectively connect said rotatable means to said drive shaft for rotation thereby and disconnect said rotatable means from said drive shaft.

9. A dispensing unit for ice comprising a housing, ice making means mounted in the lower end portion of said housing, said means including another housing mounted in said lower end portion, and a helical-shaped member rotatably mounted in said other housing in position to feed made ice from said lower end portion into the upper end portion of said first mentioned housing upon rotation of said helical-shaped member, means rotatably mounted in said upper end portion in position to discharge said made ice outwardly from said upper end portion upon rotation of said rotatable means, a drive shaft connected to said member and operable upon rotation to so rotate said member, an elongated sleeve mounted on said drive shaft in co-axial relation thereto, said rotatable means being connected to said sleeve for rotation thereby upon rotation of said sleeve around its longitudinal axis, drive means connected to said drive shaft for rotating the latter, and spring clutch means disposed in position to operatively connect said sleeve to said drive shaft and disconnect said sleeve from said drive shaft for selectively rotating said sleeve and rotatable means during said rotation of said drive shaft.

[10. An ice dispenser comprising an elongated, upstanding substantially cylindrical-shaped housing, means in the lower end portion of said housing for freezing ice therein and feeding said ice upwardly into the upper end portion of said housing a partition wall disposed in said housing in position to support said ice in said upper end portion in position wherein melt down from said last mentioned ice may flow downwardly into said lower end portion, and means for feeding ice outwardly from said upper end portion.]

11. An ice dispenser comprising an elongated, upstanding, substantially cylindrical-shaped housing, means in the lower end portion of said housing for freezing ice therein and feeding said ice upwardly into the upper end portion of said housing, a partition wall disposed in said housing in position to support said ice in said upper end portion in position wherein melt down from said last mentioned ice may flow downwardly into said lower end portion, said housing having an opening extending horizontally outwardly therethrough above said partition wall, a door hingedly mounted on said housing and pivotable between open and closed position relative to said opening, means rotatable around a vertical axis in said upper end portion in position operable upon rotation to push ice from said upper end portion outwardly through said opening when said door is open, means in said housing for deflecting ice outwardly through said opening when said door is open, and means for selectively opening and closing said door and rotating said rotatable means in relation to each other operable to discharge predetermined amounts of ice through said opening in individual charges.

12. An ice dispenser comprising an elongated, upstanding, substantially cylindrical-shaped housing having a top wall and a bottom wall, means extending through said housing for feeding water into the lower end portion thereof, refrigerating means including a cooling unit mounted in said lower end portion for freezing said water, a helical-shaped member disposed around said cooling unit and rotatable therearound in position to feed ice frozen by said unit upwardly into the upper end portion of said housing upon rotation of said member around said cooling unit, a partition wall disposed in said housing in position to support said ice in said upper end portion in position wherein melt down from said ice flows downwardly into said water, means for rotating said member around said unit, and means operable by said last mentioned means for discharging ice outwardly from said upper end portion.

13. An ice dispenser comprising an elongated, upstanding, substantially cylindrical-shaped housing having a top wall and a bottom wall, means extending through said housing for feeding water into the lower end portion thereof, refrigerating means including a cooling unit mounted in said lower end portion for freezing said water, a helical-shaped member disposed around said cooling unit and rotatable therearound in position to feed ice frozen by said unit upwardly into the upper end portion of said housing upon said rotation of said member around said cooling unit, a partition wall disposed in said housing in position to support said ice in said upper end portion in position wherein melt down from said ice flows downwardly into said water, drive means extending axially through said upper end portion and connected to said member for so rotating said member around said unit, said housing having a horizontally extending opening in the lower end portion of said upper end portion thereof, and other means mounted in said lower end portion of said upper end portion and operatively connectable to said drive means for rotation therewith around the axis of said upper end portion in position to push said ice outwardly through said opening from said upper end portion upon said rotation of said other means.

14. An ice dispenser comprising an elongated, upstanding, substantially cylindrical-shaped housing having a top wall and a bottom wall, means extending through said housing for feeding water into the lower end portion thereof, refrigerating means including a cooling unit mounted in said lower end portion for freezing said water, a helical-shaped member disposed around said cooling unit and rotatable therearound in position to feed ice frozen by said unit upwardly into the upper end portion of said housing upon said rotation of said member around said cooling unit, a horizontally extending perforated partition wall mounted in said housing between said upper and lower end portions in position to support said ice in said upper end portion, elongated drive means extending vertically through said upper end portion and connected to said member in position to rotate said member around said unit upon rotation of said drive means, a motor mounted on said top wall and operatively connected to said drive means for rotating the latter upon energization of said motor, said housing having an opening extending horizontally therethrough above said partition wall, a paddle wheel mounted in said upper end portion around said drive means and rotatable with the latter in position to push ice outwardly through said opening from said upper end portion.

15. An ice dispenser comprising an elongated, upstanding, substantially cylindrical-shaped housing having a top wall and a bottom wall, means extending through said housing for feeding water into the lower end portion thereof, refrigerating means including a cooling unit mounted in said lower end portion for freezing said water, a helical-shaped member disposed around said cooling unit and rotatable therearound in position to feed ice frozen by said unit upwardly into the upper end portion of said housing upon said rotation of said member around said cooling unit, a horizontally extending perforated partition wall mounted in said housing between said upper and lower end portions in position to support said ice in said upper end portion, elongated drive means extending vertically through said upper end portion and connected to said member in position to rotate said member around said unit upon rotation of said drive means, a motor mounted on said top wall and operatively connected to said drive means for rotating the latter upon energization of said motor, said housing having an opening extending horizontally therethrough above said partition wall, a door hingedly mounted on said housing and pivotable into opened and closed position relative to said opening, means including a paddle wheel connected to said drive means for rotating said ice in said upper end portion around the axis of the latter, and means including said door and a wedge-shaped member disposed above said opening for deflecting charges of ice outwardly through said opening during said rotation of said ice when said door is open.

*16. A dispensing unit for ice comprising a first housing, said first housing including a chamber for storing ice, a second housing disposed beneath the first housing, means in said second housing for making ice and for augering it upwardly for storage in said first housing, rotatable means in said first housing for dispensing ice from the chamber, and common drive means for operating said augering means and for rotating said dispensing means.*

*17. A dispensing unit for ice comprising a first housing, said first housing including a chamber for storing ice, a second housing disposed beneath the first housing, means in said second housing for making ice, means in said second housing operable to feed the ice upwardly for storage in said first housing, independently operable means in said first housing for dispensing ice therefrom, common drive means for operating both said feeding means and said dispensing means, and means for connecting first one and then the other of said operable means to said drive means.*

References Cited by the Examiner

The following references, cited by the Examiner, are of record in the patented file of this patent or the original patent.

UNITED STATES PATENTS

| | | | |
|---|---|---|---|
| 1,210,636 | 1/1917 | Garst | 222—242 |
| 1,940,138 | 12/1933 | McAdam | 222—410 |
| 2,150,792 | 3/1939 | Willat | 62—354 |
| 2,629,986 | 3/1953 | Roberts | 62—349 |
| 2,639,594 | 5/1953 | Watt | 62—353 |
| 2,695,502 | 11/1954 | Muffly. | |
| 2,724,949 | 11/1955 | Kattis | 62—354 |
| 2,791,887 | 5/1957 | Hennig | 62—344 X |
| 2,925,721 | 2/1960 | Richelli | 62—348 X |
| 2,969,650 | 1/1961 | Eschenburg et al. | 62—344 X |
| 3,036,737 | 5/1962 | King et al. | 222—241 |
| 3,104,835 | 9/1963 | Weber | 241—94 |
| 3,163,020 | 12/1964 | Ross | 62—138 |

FOREIGN PATENTS

| | | |
|---|---|---|
| 220,263 | 2/1959 | Australia. |

ROBERT A. O'LEARY, *Primary Examiner.*

W. E. WAYNER, *Assistant Examiner.*